United States Patent [19]

Ausherman

[11] 4,136,826

[45] Jan. 30, 1979

[54] WATER ACTIVATED STOP FOR SPINNERS

[76] Inventor: Harry S. Ausherman, 715 Fairway, Wichita, Kans. 67212

[21] Appl. No.: 852,611

[22] Filed: Nov. 18, 1977

[51] Int. Cl.² ............................................. A01G 25/16
[52] U.S. Cl. ...................................... 239/212; 239/252
[58] Field of Search ...................... 239/212, 213, 252; 137/344

[56] References Cited
U.S. PATENT DOCUMENTS

| 2,750,954 | 8/1973 | Williams | 239/212 |
| 3,750,696 | 8/1973 | Cornelius | 137/344 |

Primary Examiner—James B. Marbert
Attorney, Agent, or Firm—John H. Widdowson

[57] ABSTRACT

A water activated stop device for preventing the continued rotation of spinners mounted on the top of a main water distribution pipe of a center pivot irrigation system. The stop device communicably connected to the water in the main water distribution pipe and held in a disengaged position when water pressure is applied thereto. The device engaging the irrigation spinners and preventing the spinners from rotating when the water pressure is turned off.

6 Claims, 3 Drawing Figures

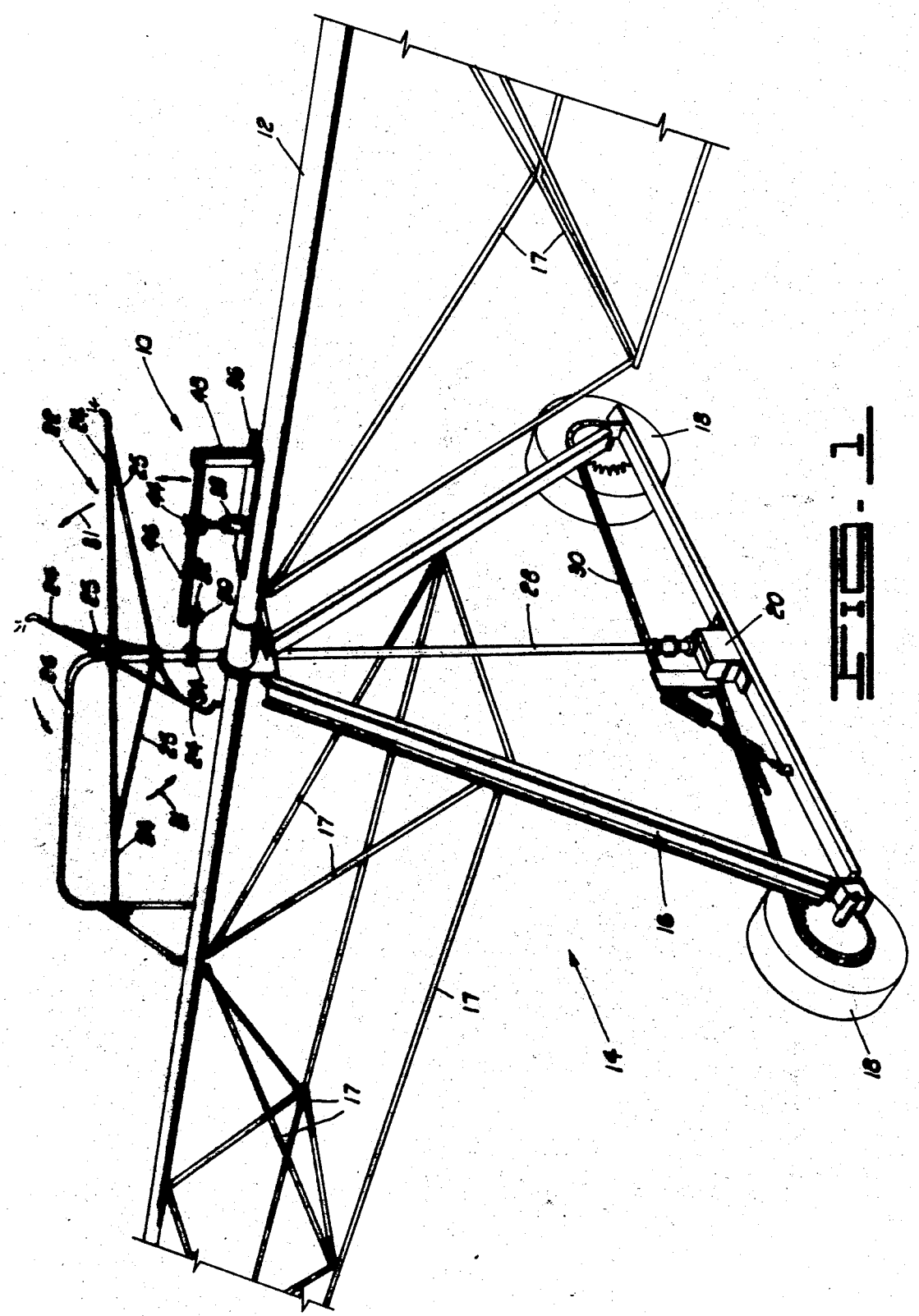

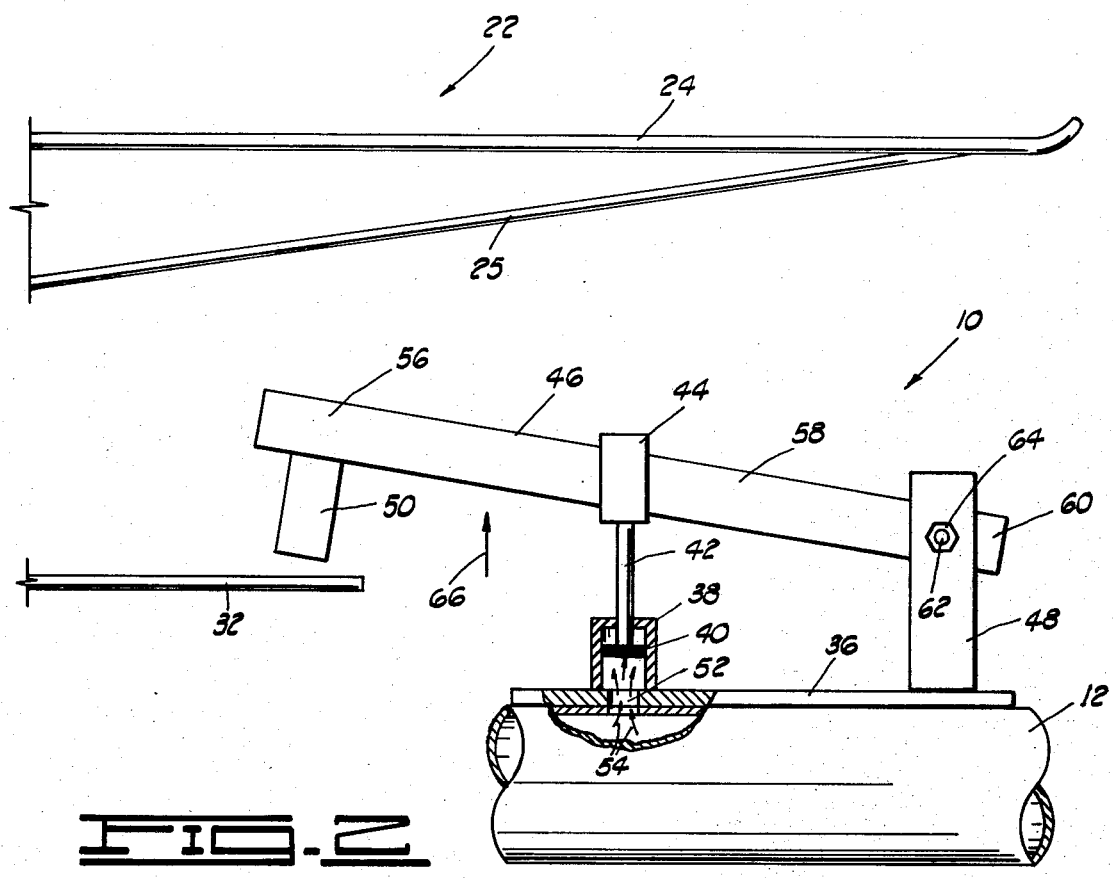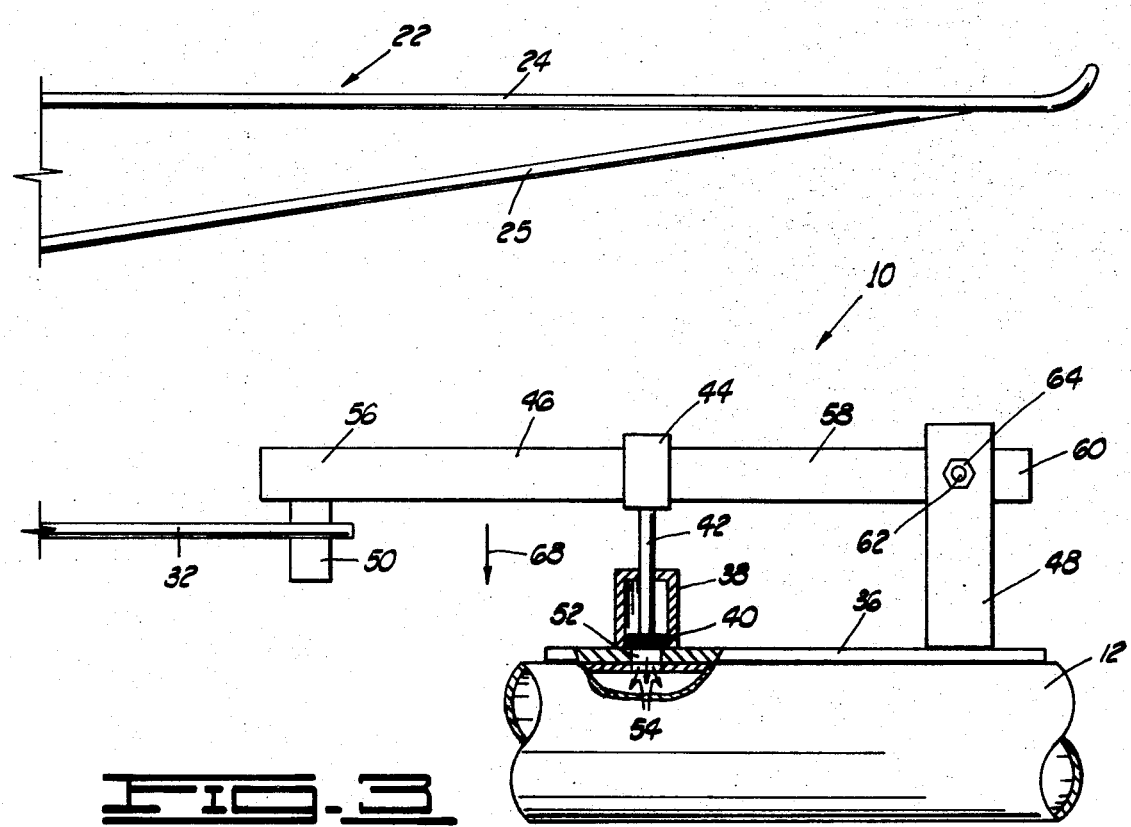

WATER ACTIVATED STOP FOR SPINNERS

BACKGROUND OF THE INVENTION

This invention relates generally to center pivot irrigation equipment and more particularly, but not by way of limitation, to a stop device for preventing the rotation of spinners used for distributing water from the top of a center pivot irrigation system.

Heretofore spinners mounted on the main water distribution pipe of a center pivot irrigation system were free to continue to rotate when the water pressure to the spinners was turned off. Also, the spinners were free to rotate when contacted by the wind. The continued rotation of the spinners, which are connected to a vertical spinner drive shaft which is used for driving rubber tired drive wheels, allowed continued movement of the irrigation system, which caused the equipment to travel in an irregular path. Prior to the subject invention, there was no means for preventing the continued rotation of the spinners used for distributing water received from the distribution pipe.

Heretofore there have been various types of sprinkler systems having water stops and water-powered brakes for preventing the travel of sprinkler systems. None of the prior art devices provided the novel structure for co-acting with the water pressure in the main water distribution pipe for preventing the continued rotation of the irrigation spinners.

SUMMARY OF THE INVENTION

The subject invention prevents the continued rotation of spinners mounted on the main water distribution pipe after the water pressure has been turned off. The invention is simple in design, rugged in construction, and can be quickly mounted to new and existing irrigation equipment.

The stop device prevents the irregular travel of the center pivot irrigation system when the spinners are allowed to continue to rotate when the water pressure is turned off or the spinners are rotated by wind.

Because of the irregular movement of the irrigation system is eliminated, center pivot irrigation towers are prevented from moving out of line and the irrigation equipment becoming tangled.

The water activated stop device for spinners mounted on the main water distribution pipe of the center pivot irrigation system includes a base plate attached to the top of the water distribution pipe. A water cylinder is mounted on the top of one end of the plate and communicably connected to the water supply in the pipe. A piston is mounted in the cylinder with a piston rod extending upwardly and outwardly from the top of the cylinder. The piston is raised upwardly in the cylinder when the water pressure is applied thereto. The piston is lowered downwardly by gravity when the water pressure is turned off. A "U" shaped pivot arm guide is attached to the top of the piston rod. A mounting bar is attached to the other end of the plate and extends upwardly therefrom. One end of an elongated pivot arm is pivotally mounted to the top of the mounting bar with a center portion of the pivot arm received in the guide and guided thereon. The other end of the pivot arm includes a stop arm attached thereto for engaging a spinner rod attached to a rotating spinner shaft when the water pressure is turned off. When the water pressure is turned on, the stop arm is raised upwardly by the pivot arm thereby disengaging the spinner rod.

The advantages and objects of the invention will become evident from the following detailed description when read in conjunction with the accompanying drawings which illustrate the preferred embodiments of the invention.

BRIEF DESCRIPTION OF THE DRAWINGS

In FIG. 1, a portion of a center pivot irrigation system is shown with the water activated stop device mounted on top of the main water distribution pipe and adjacent a spinner.

In FIG. 2, a front view of the stop device is illustrated in a raised disengaged position.

FIG. 3 is a front view of the stop device lowered and in an engaged position for preventing the rotation of the spinner.

DETAILED DESCRIPTION OF THE DRAWINGS

In FIG. 1, the water activated stop device is designated by general reference numeral 10. The device 10 is seen mounted on top of a main water distribution pipe 12 which makes up part of a center pivot irrigation system designated by general reference numeral 14. The system 14 includes a center pivot attached to one end of the pipe 12 and a water pump connected to the pipe for supplying water thereto. The center pivot and water pump are not shown in the drawings. The system 14 further includes a plurality of angular shaped towers 16 with one of the towers 16 shown in FIG. 1. The towers 16 with bracing 17 support the pipe 12 thereon and include a pair of rubber tired drive wheels 18 which are chain-driven by a reduction gear box 20.

Water is supplied to a plurality of spinners 22 in which one of the spinners 22 is shown mounted on the tower 14. The spinner 22 includes rotatable spinner arms 24 with spinner arm braces 25 which receive water through a water conduit 26 communicably attached to the pipe 12. As water under pressure is supplied to the spinner arms 24 through the conduit 26, the spinner arms 24 sprinkle water outwardly in a circle for irrigating the ground surface as the center pivot system 14 pivots in a circle. The spinner arms 24 are rotatably mounted on top of a vertical spinner drive shaft 28 which drives the reduction gear box 20 which in turn engages a drive chain 30 connected to the wheels 18. The rotation of the spinner 22 is indicated by arrows 31.

In the past, when the water pressure has been turned off to the pipe 12, the spinner arms 24 continue to rotate thereby turning the drive shaft 28 which in turn drives the wheels 18 in an irregular path and causing the irrigation system 14 to become out of line and tangled, causing damage to the various equipment making up the irrigation system 14. Also, when high wind conditions occur, the spinner 22 is rotated by the wind again causing the drive shaft 28 to rotate the wheels 18 causing the system 14 to travel in an irregular path.

To prevent the spinner 22 from continuing to rotate during prevailing wind conditions or after the water pressure has been turned off, a horizontal spinner rod 32 is attached to a collar 34 secured to the drive shaft 28. The device 10, when the water pressure is turned off, contacts the rod 32 preventing the rotation of the shaft 28 and in turn preventing the spinner 22 from rotating.

The device 10 includes a base plate 36 mounted on top of the pipe 12. Attached to the top of the plate 36 is a water cylinder 38 communicably connected to the water supply in the pipe 12. Mounted inside the cylinder 38 is a vertically disposed piston 40 with a piston rod 42 attached thereto and extending upwardly and outwardly from the top of the cylinder 38. The piston 40 and piston rod 42 are shown in FIGS. 2 and FIG. 3. Mounted on top of the piston rod is a "U" shaped pivot arm guide 44 for receiving a pivot arm 46 therein. One end of the pivot arm 46 is pivotally mounted on a mounting bar 48 attached to one end of the base plate 36. The other end of the pivot arm 46 includes a downwardly extending stop arm 50 which is used for contacting the spinner rod 32.

In FIG. 2, the device 10 is shown in a raised disengaged position for allowing the spinner 22 to freely rotate during the sprinkling of the ground surface. In this view, a cut-away section of a portion of the pipe 12 and base plate 36 is shown wherein an aperture 52 is deilled through the plate 36 and pipe 12 so that water pressure indicated by arrows 54 may be supplied to the bottom of the piston 40 thereby raising the piston 40 upwardly in the cylinder 38. As the piston 40 is raised, the piston rod 42 in turn is raised, which lifts the "U" shaped pivot arm guide 44. The pivot arm 46 includes a first end portion 56, a center portion 58, and a second end portion 60. As the "U" shaped pivot arm guide 44 is raised, the center portion 58 of the pivot arm 46 in turn is raised pivoting the second end portions 60 of the pivot arm 46 on the top of the mounting bar 48. The pivot arm 46 is pivotally attached to the mounting bar 48 by a threaded bolt 62 attached to a nut 64. As the pivot arm 46 is raised upwardly, the stop arm 50, which is attached to the first end portion 56 of the pivot arm 46 is in turn raised above the circular plane wherein the spinner rod 32 rotates. The upward disengaged position of the device 10 is indicated by arrow 66.

In FIG. 3, the device 10 is in a lowered engaged position indicated by arrow 68. When the water pressure is turned off, the weight of the piston 40, piston rod 42, guide 44, and pivot arm 46 resting therein, urges the piston 40 downwardly bleeding the cylinder 38 of any remaining water therein. When this happens, the pivot arm 46 lowers into a horizontal position with the stop arm 50 positioned to engage the rotating spinner rod 32 and preventing the continued rotation of the rod 32 until again the water pressure is turned on supplying water to the spinner 22 and raising the piston 40 in the cylinder 38.

While the device 10 is shown mounted on top of the pipe 12, it should be understood that the device 10 could be mounted vertically or in any other position with the piston 40 spring mounted and achieve the same results in providing means for engaging the spinner 22.

Changes may be made in the construction and arrangement of the parts or elements of the embodiment as disclosed herein without departing from the spirit or scope of the invention as defined in the following claims.

I claim:

1. A water activated stop device for spinners mounted on the main water distribution pipe of a center pivot irrigation system, the device comprising:

a water cylinder mounted on top of the main water distribution pipe and communicably connected to the water supply in the water distribution pipe;

a piston mounted in said cylinder, said piston extending upwardly and outwardly from the top of said cylinder, said piston raised upwardly in said cylinder when the water pressure is applied thereto, said piston lowered downwardly when the water pressure is turned off; and stop means pivotally mounted on top of the water distribution pipe and raised and lowered by said piston, said stop means for releasably engaging the spinner when the water pressure is turned off.

2. The device as described in claim 1 wherein said stop means includes an elongated pivot arm having one end pivotally attached to the top of the water distribution pipe, the other end of said pivot arm releasably engaging the spinner when the water pressure is turned off.

3. The device as described in claim 2 further including a "U" shaped pivot arm guide attached to the top of said piston and receiving a portion of said pivot arm therein and guiding said pivot arm when it is raised and lowered by said piston.

4. The device as described in claim 3 further including a stop arm attached to the end of the pivot arm for engaging a spinner rod attached to a rotating spinner shaft when the water pressure is turned off.

5. The device as described in claim 4 further including a base plate attached to the top of the water distribution pipe and receiving said water cylinder thereon, and a mounting bar attached to the top of said base plate, said pivot arm pivotally attached to the top of said mounting bar.

6. A water activated stop device for spinners mounted on the main water distribution pipe of a center pivot irrigation system, the device comprising:

a base plate attached to the top of the water distribution pipe, said plate having a first end portion and a second end portion;

a water cylinder mounted on top of the first end portion of said plate and communicably connected to the water supply in the water distribution pipe;

a piston mounted in said cylinder, said piston having a piston rod extending upwardly and outwardly from the top of said cylinder, said piston raised upwardly in said cylinder when water pressure is applied thereto, said piston lowered downwardly when the water pressure is turned off;

a "U" shaped pivot arm guide attached to the top of said piston rod;

a mounting bar attached to the second end portion of said plate and extending upwardly therefrom;

an elongated pivot arm having a first end portion, a center portion received in said "U" shaped guide and guided thereon, and a second end portion pivotally attached to the top of said mounting bar; and a stop arm attached to the first end portion of said pivot arm and engaging a spinner rod attached to a rotating spinner shaft when the water pressure is turned off, when the water pressure is turned on said stop arm raised upwardly by said pivot arm thereby disengaging the spinner rod.

* * * * *